US006373379B1

(12) United States Patent
Frantz

(10) Patent No.: US 6,373,379 B1
(45) Date of Patent: Apr. 16, 2002

(54) AUTOMOBILE SECURITY SYSTEM WITH LOCATION AND PANIC ALERTS

(75) Inventor: William T Frantz, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/692,773

(22) Filed: Oct. 19, 2000

(51) Int. Cl.[7] .................................................. B60Q 1/00

(52) U.S. Cl. ............... 340/425.5; 340/426; 340/825.36; 340/825.49; 307/10.2

(58) Field of Search .............................. 340/425.5, 426, 340/825.36, 825.49, 825.69; 307/10.2

(56) References Cited

U.S. PATENT DOCUMENTS 4,884,055 A * 11/1989 Memmola ................... 340/426
4,910,493 A * 3/1990 Chambers et al. .......... 340/426
5,543,775 A 8/1996 Huck ......................... 338/306
5,808,564 A * 9/1998 Simms et al. ............... 340/990
5,828,297 A * 10/1998 Banks et al. ................ 340/426
5,874,889 A * 2/1999 Higdon et al. .............. 340/426
6,130,622 A * 10/2000 Hussey et al. ......... 340/825.31
6,147,598 A * 11/2000 Murphy et al. ............. 340/426
6,265,988 B1 * 7/2001 LeMense et al. ...... 340/825.69

* cited by examiner

*Primary Examiner*—Nina Tong
(74) *Attorney, Agent, or Firm*—Laura C. Hargitt

(57) ABSTRACT

An apparatus is provided that includes a remote control configured to transmit a first signal upon a first activation of the remote control and configured to transmit a second signal upon a second activation of the remote control. A controller of the apparatus is configured to receive the first signal and the second signal transmitted by the remote control and also configured to enter a vehicle location state upon receipt of the first signal and automatically transition to a panic alert state after a predetermined period unless the second signal is received by the controller before expiration of the predetermined period. The apparatus also includes an attention device operatively coupled to the controller, which is configured to produce vehicle location effects during the vehicle location state panic alert effects during the panic alert state of said controller.

20 Claims, 2 Drawing Sheets

AUTOMOBILE SECURITY SYSTEM WITH LOCATION AND PANIC ALERTS

BACKGROUND OF THE INVENTION

1. Technical Field

The present invention generally relates to an automobile security system, and more particularly to an automobile security system having panic and locate alerts.

2. Background Information

Automobile security systems have been available for several years. These security systems produce audible and visual alarm effects after conditions are detected that are indicative of an unauthorized tampering with a vehicle. The alarm effects generated by the security system are intended to draw attention to the automobile in order to discourage the unauthorized activity of a thief, vandal or intruder.

Generally, most automobile security systems include a remote control for remote activation and deactivation. The remote control allows the security system to be disarmed before entering the automobile and armed after exiting the automobile. In addition to remote activation and deactivation, panic and locate alert features are also typically activated and deactivated by the remote control.

The panic alert feature provides the ability to remotely activate the alarm effects in order to draw attention to the general area of the automobile. The alarm effects generated by the panic alert feature are typically similar to or the same as the alarm effects produced by the security system for an unauthorized tampering with the vehicle. Therefore, significant attention is drawn to the general area of the automobile. While this heightened level of attention is desirable under certain circumstances, there are circumstances in which it is preferable to draw less attention to the vehicle. The locate alert feature typically produces audible and visual effects that are less noticeable than the effects produced in an alarm situation. This allows the user to identify the location of the automobile without generating the heightened level of attention desired in a panic situation.

SUMMARY OF THE INVENTION

In accordance with the teachings of the present invention, methods and apparatus are provided for vehicle location and panic alert. The apparatus includes a remote control configured to transmit a first signal upon a first activation of the remote control and configured to transmit a second signal upon a second activation of the remote control. A controller of the apparatus is configured to receive the first signal and the second signal transmitted by the remote control and also configured to enter a vehicle location state upon receipt of the first signal and automatically transition to a panic alert state after a predetermined period unless the second signal is received by the controller before expiration of the predetermined period. The apparatus also includes an attention device operatively coupled to the controller, which is configured to produce vehicle location effects during the vehicle location state and panic alert effects during the panic alert state.

BRIEF DESCRIPTION OF THE DRAWINGS

The present invention will hereinafter be described in conjunction with the appended drawing figures, wherein like numerals denote like elements, and.

DETAILED DESCRIPTION OF THE PREFERRED EMBODIMENT

The following detailed description of a preferred exemplary embodiment of the invention is mainly exemplary in nature and is not intended to limit the invention or its applications or uses.

Figure 1:
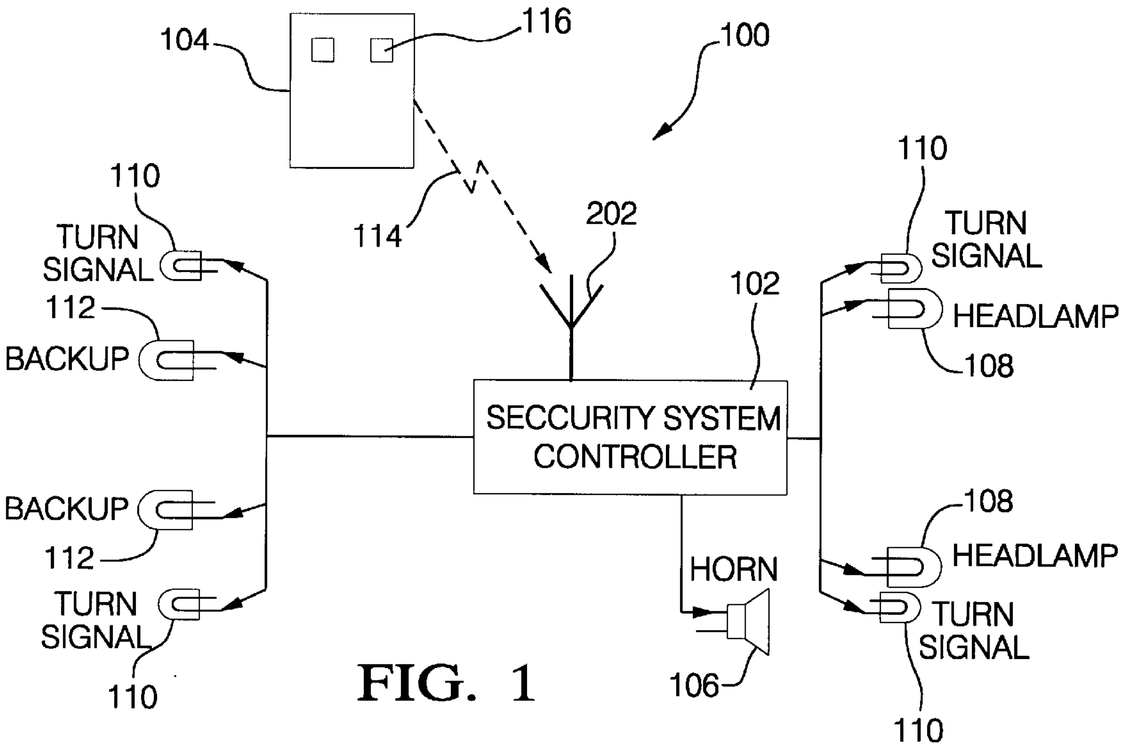
FIG. 1 is a simplified diagram of an automobile security system with location and panic alerts according to a preferred exemplary embodiment of the present invention.

FIG. 1 illustrates a vehicle security system 100 with location and panic alert features according to a preferred exemplary embodiment of the present invention. The vehicle security system 100 includes, but is not limited to, a security system controller 102, a remote control 104 and attention devices. The attention devices may be any number of mechanisms that produce audible and/or visual effects. For example, the attention devices may be a horn 106, headlamps 108, turn signal lamps 110 or backup lamps 112. The security system controller 102 is configured to receive a signal 114 from the remote control 104, select an operation state based upon the signal 114, and transmit signals to the attention devices such that audible and/or visual alert patterns are created that correspond to a predetermined operation state of the security system 100. The security system controller 102 preferably has at least three operation states that include, but are not limited to, an inactive state, a panic state and a location state.

The security system controller 102 is configured to select between the inactive state, panic state or location state based at least in part on the signal 114 generated by the remote control 104. The signal 114 generated by the remote control may be an electromagnetic signal, preferably within the radio frequency (RF) spectrum, or an optical or acoustic signal. The remote control 104, upon activation of a panic/locate button 116, or alternatively a lever, knob or other activation device, generates the signal 114. Preferably, the signal 114 is produced by the remote control 104 for the duration in which the panic/locate button 116 is physically activated by the remote control user. More specifically, the remote control 114 preferably generates the signal 114 when pressure is applied to the panic/locate button 116, and ceases to produce the signal 114 when the pressure is removed from the panic/locate button 116. This press and release action results in the remote control 104 transmitting a first signal, and a second signal will be generated when the press and release action is repeated by the remote control user.

Figure 2:
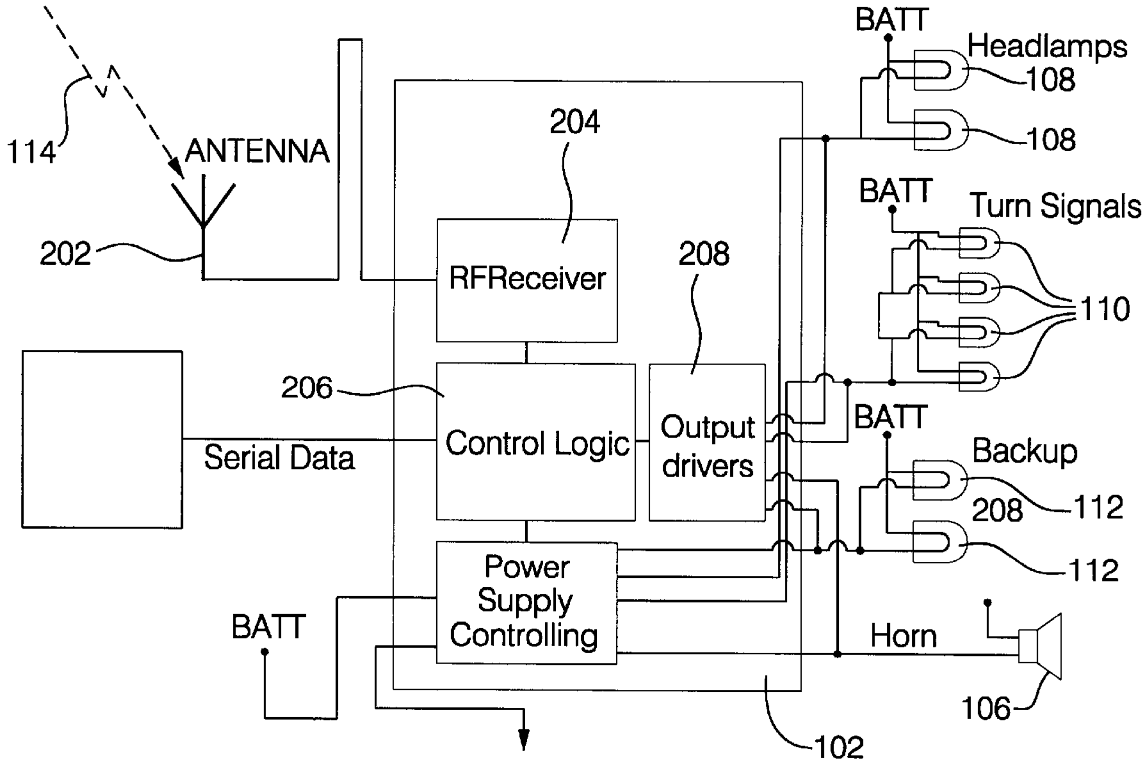
FIG. 2 is the security system controller of FIG. 1.
Figure 3:
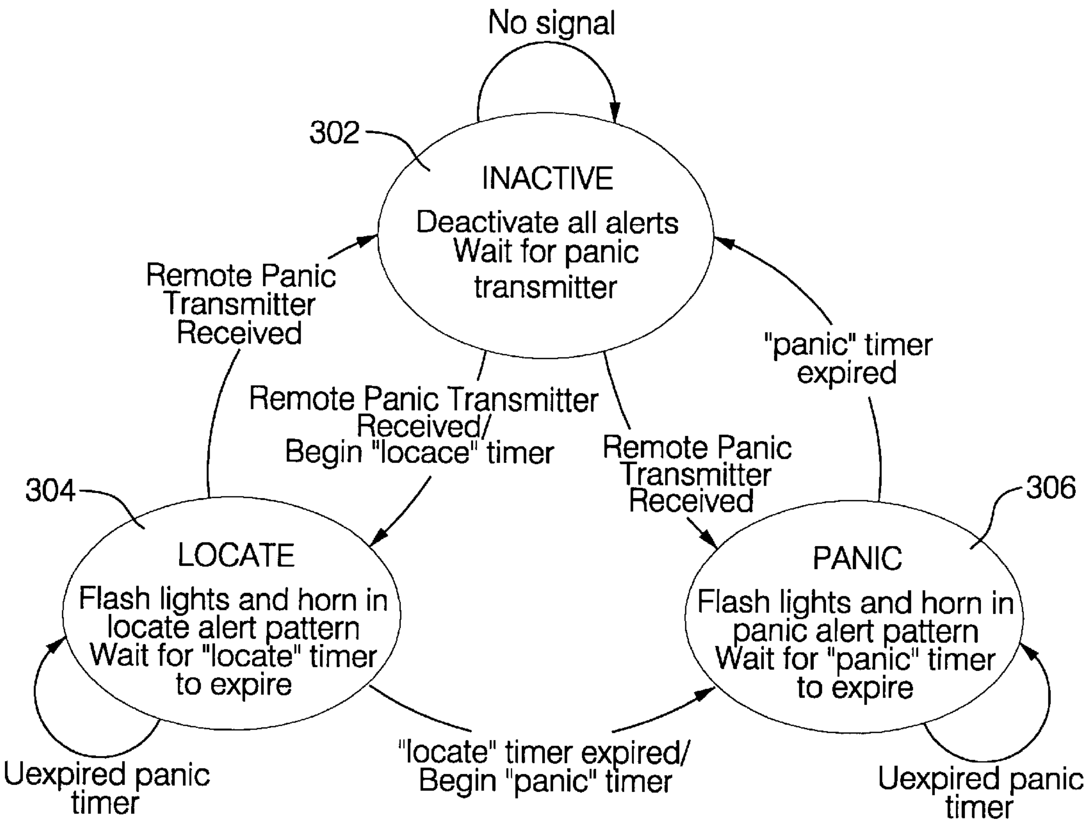
FIG. 3 is a state diagram of control logic executed by the security system controller of FIG. 2 according to a preferred exemplary embodiment of the present invention.

Referring to FIG. 2, the transmissions of the remote control 104 are collected by an antenna 202 that is configured to intercept electromagnetic radiation within a selected frequency band. The antenna 210 may be any number of electromagnetic interception devices, including, but not limited to a wave guide, a coaxial cable, an optical fiber or an infrared frequency transducer. The electromagnetic radiation intercepted by the antenna 202 is converted to an electrical signal with a RF receiver 204, which is presented to the control logic 204 for operation state selection Referring to FIG. 3, a state diagram 300 of the control logic is presented according to a preferred exemplary embodiment of the present invention. The state diagram 300 has the inactive state 302, location state 304 and panic state 304. Preferably, the inactive state 302 is the reset state and the control logic remains in the inactive state 302 until a first signal is received from the remote control. Upon receipt of the first signal from the remote control, the control logic transitions from the inactive state 302 to the location state 304.

Once the control logic has entered the location state 304, a locate timer is initiated by the control logic. The control logic remains in the location state 304 until either the locate timer indicates that a predetermined location period has lapsed or a second signal is received from the remote control. Preferably, the predetermined location period is greater than about 3 second and less than about 5 seconds, but any number of time periods may be selected for this period.

In the event that a second signal is received from the remote control before the locate timer indicates that the predetermined location period of time has lapsed since the first signal was received, the control logic transitions from the location state 304 to the inactive state 302. However, if the second signal is not received from the remote control before the locate timer indicates that the predetermined location period of time has lapsed since the first signal was received, the control logic transitions to the panic state 306, and initiates a panic timer.

The control logic remains in the panic state 306 until either the panic timer indicates that a predetermined panic period has expired or the second signal is received from the remote control. Preferably, the predetermined panic period is greater than about 2 seconds and less than about 30 seconds, but any number of periods may be selected for this period.

Figure 4:
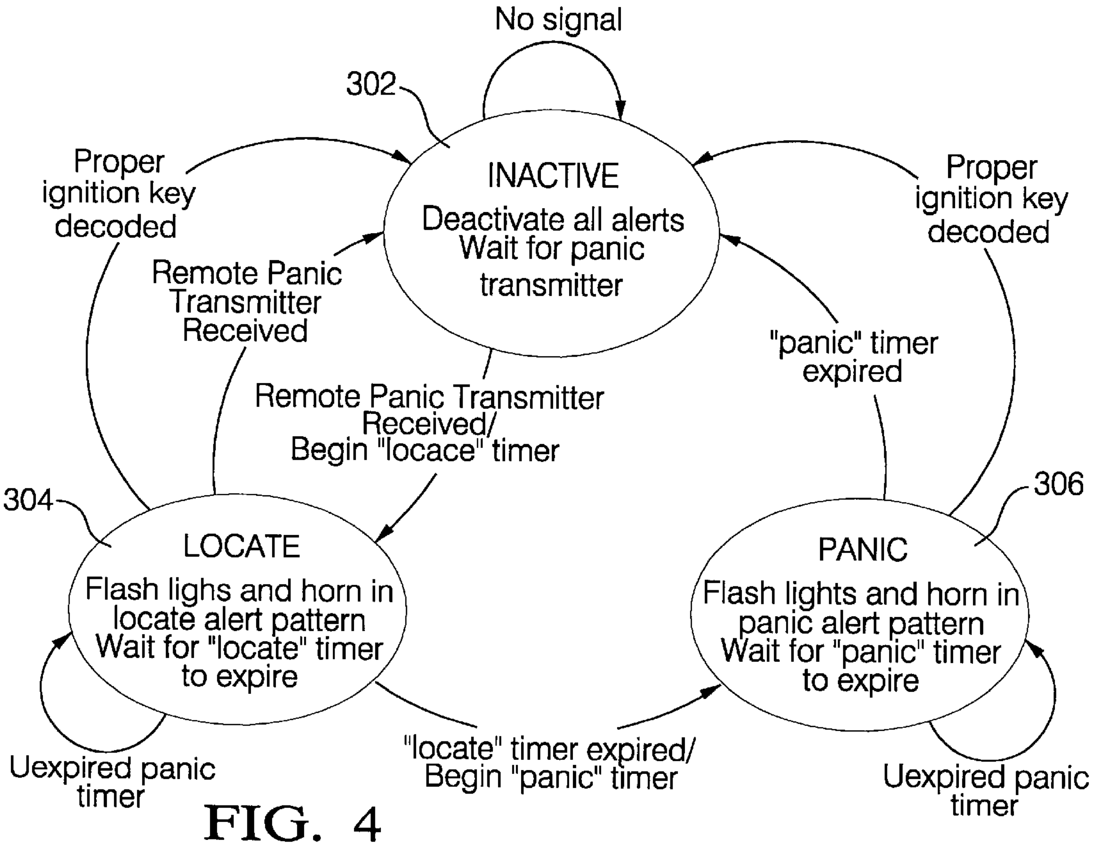
FIG. 4 is a state diagram of control logic executed by the security system of FIG. 2 according to an alternate exemplary embodiment of the present invention.

Referring to FIG. 4, the control logic may also be configured to transition from the panic state 306 to the inactive state 302 only if the predetermined panic period has expired or an ignition signal is received by the control logic that indicates a valid ignition key has been detected in an ignition cylinder. Furthermore, the control logic may also be configured to transition from the locate state 304 to the inactive state 302 upon receipt of the ignition signal.

Referring to FIG. 2, the current state of the control logic 206 is provided to an output driver that is operatively connected to one or more of the attention devices (i.e., horn 106, headlamps 108, turn signal lamps 110 or backup lamps 112) for production of audio and/or visual affects that vary based upon the current state. More specifically, the output device is configured to drive the attention devices such that minimal or no audio and/or visual effects are produced during the inactive state, vehicle location effects are produced during the locate state and panic alert effects are produced during the panic state.

The vehicle location effects are preferably less noticeable than the panic alert effects. For example, the panic alert effects may consist of audio and visual effects while the vehicle location effects may be limited to visual effects, or the panic alert effects may consist of audio and visual effects having a greater volume and illumination intensity than the location effects. However, it should be appreciated that any number of audio and visual variations may be utilized to provide a differentiation between the panic effects and the location effects in order to draw a heightened level of attention to the general vicinity of the vehicle in the event that the panic state is entered and less attention to the vehicle in the location state. Therefore, the vehicle operator is provided the ability to identify the location of the automobile with minimal distraction and annoyance to others while attracting a significant amount of attention that is desirable in a panic situation.

The foregoing detailed description provides preferred exemplary embodiments only, and is not intended to limit the scope, applicability, or configuration of the invention in any way. Rather, the ensuing detailed description will provide those skilled in the art with a convenient road map for implementing a preferred embodiment of the invention. It being understood that various changes may be made in the function and arrangement of elements described in an exemplary preferred embodiment without departing from the spirit and scope of the invention as set forth in the appended claims.

What is claimed is:

1. An vehicle security system operable to provide vehicle location and panic alert, comprising:

a remote control configured to transmit a first signal upon a first activation of said remote control and configured to transmit a second signal upon a second activation of said remote control;

a controller configured to receive said first signal and said second signal transmitted by said remote control, said controller configured to enter a vehicle location state upon receipt of said first signal and automatically transition to a panic alert state after a predetermined location period unless said second signal is received by said controller before expiration of said predetermined location period;

an attention device operatively coupled to said controller, said attention device configured to produce vehicle location effects during said vehicle location state of said controller and configured to produce panic alert effects during said panic alert state of said controller.

2. The vehicle security system of claim 1, wherein said controller is configured to enter an inactive state if said second signal is received by said controller before expiration of said predetermined location period.

3. The vehicle security system of claim 1, wherein said controller is configured to transition from said panic alert state to an inactive state if said second signal is received by said controller.

4. The vehicle security system of claim 1, wherein said controller is configured to transition from said panic alert state to an inactive state after a predetermined panic period.

5. The vehicle security system of claim 1, wherein said controller is configured to transition from said panic alert state to an inactive state upon receipt of an ignition signal by said controller.

6. The vehicle security system of claim 1, wherein said controller is configured to transition from said vehicle location state to an inactive state upon receipt of an ignition signal by said controller.

7. The vehicle security system of claim 1, wherein said vehicle location effects and panic alert effects are audio effects and said audio effects of said vehicle location effects have a greater volume than said audio effects of said panic alert effects.

8. The vehicle security system of claim 1, wherein said vehicle location effects and panic alert effects are visual effects and said visual effects of said vehicle location effects have a greater illumination intensity than said visual effects of said panic alert effects.

9. The vehicle security system of claim 1, wherein said predetermined location period is greater than about 3 seconds and less than about 5 seconds.

10. The vehicle security system of claim 1, wherein said predetermined panic period is greater than about 2 seconds and less than about 30 seconds.

11. A method of providing vehicle location and panic alert, comprising:

transmitting a first signal upon a first activation of a remote control and a second signal upon a second activation of said remote control;

receiving said first signal and said second signal with a controller;

entering a vehicle location state of said controller upon receipt of said first signal; and transitioning to a panic alert state after a predetermined location period unless said second signal is received by said controller before expiration of said predetermined period;

producing vehicle location effects with an attention device during said vehicle location state of said controller; and producing panic alert effects during said panic alert state of said controller.

12. The method of providing vehicle location and panic alert of claim 11, further comprising entering an inactive state if said second signal is received by said controller before expiration of said predetermined location period.

13. The method of providing vehicle location and panic alert of claim 11, further comprising transitioning from said panic alert state to an inactive state if said second signal is received by said controller.

14. The method of providing vehicle location and panic alert of claim 11, further comprising transitioning from said panic alert state to an inactive state after a predetermined panic period.

15. The method of providing vehicle location and panic alert of claim 11, further comprising transitioning from said panic alert state to an inactive state upon receipt of an ignition signal by said controller.

16. The method of providing vehicle location and panic alert of claim 11, further comprising transitioning from said vehicle location state to an inactive state upon receipt of an ignition signal by said controller.

17. The method of providing vehicle location and panic alert of claim 11, wherein said vehicle location effects and panic alert effects are audio effects and said audio effects of said vehicle location effects have a greater volume than said audio effects of said panic alert effects.

18. The method of providing vehicle location and panic alert of claim 11, wherein said vehicle location effects and panic alert effects are visual effects and said visual effects of said vehicle location effects have a greater illumination intensity than said visual effects of said panic alert effects.

19. The method of providing vehicle location and panic alert of claim 11, wherein said predetermined location period is greater than about 3 seconds and less than about 5 seconds.

20. The method of providing vehicle location and panic alert of claim 11, wherein said predetermined panic period is greater than about 2 seconds and less than about 30 seconds.

* * * * *